July 8, 1969   J. M. INGHAM ET AL   3,454,309
HYDROSTATIC MACHINE TOOL SPINDLE ASSEMBLY WITH
BACKING-UP MECHANICAL ANTIFRICTION BEARING
Filed Oct. 4, 1967

3,454,309
Patented July 8, 1969

3,454,309
HYDROSTATIC MACHINE TOOL SPINDLE ASSEMBLY WITH BACKING-UP MECHANICAL ANTIFRICTION BEARING
John Milton Ingham, North Kingstown, and Paul Wilfrid Carrier, Pawtucket, R.I., assignors to Brown & Sharpe Manufacturing Company, North Kingstown, R.I., a corporation of Rhode Island
Filed Oct. 4, 1967, Ser. No. 672,844
Int. Cl. F16c *17/00, 19/50, 21/00*
U.S. Cl. 308—35  3 Claims

ABSTRACT OF THE DISCLOSURE

The disclosure of the invention comprises a machine tool spindle mounted within a pair of hydrostatic bearings and with an additional outboard backing-up antifriction roller bearing disposed immediately adjacent the tool supporting end of the spindle, the hydrostatic bearings having a radial clearance of approximately .001 inch between the hydrostatic boxes and the spindle which produces a fluid supported bearing having high accuracy for light and medium loads, and the roller bearing having a substantially smaller radial clearance in the order of .0004 inch, so that the roller bearing is inoperative under light and medium spindle loads and becomes operative to share heavy loads only which tend to displace the spindle in its hydrostatic bearings sufficiently to engage the spindle with said roller bearing.

---

The present invention relates to an improved bearing assembly for machine tools, and more particularly to an improved hydrostatic spindle bearing assembly having a mechanical backing-up bearing associated therewith.

Good machining practice dictates that when machining to close tolerances, the cross section of the chip being removed must be small as compared to the chips removed during roughing cuts where precision is not the basic requirement. The rapid increase in the cutting forces which accompanies the increased cross section produces increased deflections in the various members of the machine supporting both the work and the tool with corresponding increase of error in the machined surface.

Hydrostatic bearings provide previously unobtainable accuracy which makes their use desirable for close tolerance machining. Some types of mechanical antifriction bearing, roller bearings for example, although considerably less accurate than hydrostatic bearings, offer very high load carrying capacity.

It is a principal object of the invention to provide an improved hydrostatic spindle bearing assembly including one or more auxiliary bearings which will extend the metal removing rate for heavy roughing cuts without losing the high precision capabilities of a hydrostatic bearing spindle when used for precise machining involving light cuts.

More specifically, it is an object of the invention to provide a hydrostatic spindle bearing assembly including one or more normally inoperative mechanical antifriction roller bearings having a small clearance, so that under heavy loads, as the center line of the spindle shifts off center of the hydrostatic bearing, the spindle will contact the mechanical bearing and receive additional support from its high load carrying capacity, thus substantially increasing the metal removing capacity of the spindle.

With the above and other objects in view as may hereinafter appear, the several features of the invention will be readily understood by one skilled in the art from the following description taken in connection with the accompanying drawings in which.

Figure 2:
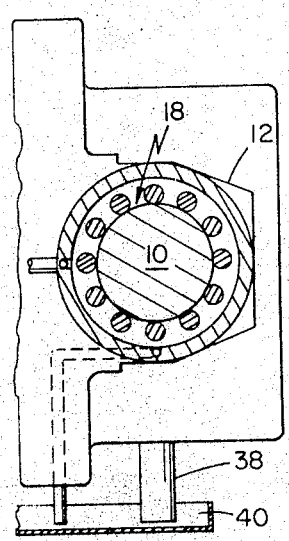
FIG. 2 is a cross section taken on a line 2—2 of FIG. 1 illustrating particularly the outboard antifriction roller bearing.

Referring to the drawing, a machine tool spindle and spindle bearing assembly is shown including a horizontally disposed machine tool spindle 10, a housing 12, a pair of spaced hydrostatic bearings 14 and 16, and an outboard spindle roller bearing 18, located closely adjacent the tool supporting end of the spindle. The spindle 10 is formed toward the rear end thereof with a driven gear 20, which meshes with gearing, not shown, by means of which the spindle is driven. The hydrostatic bearings 14 and 16 are similar to those shown, for example, in U.S. Patent No. 3,193,337, dated July 6, 1965, to Levesque et al. for Hydrostatic Bearing.

Figure 3:
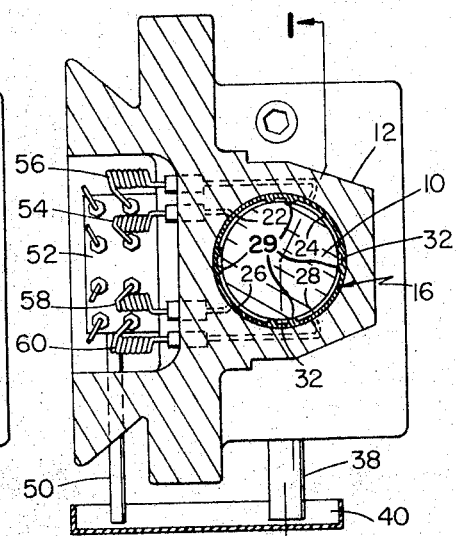
FIG. 3 is a cross section taken on a line 3—3 of FIG. 1 illustrating particularly the rear spindle hydrostatic bearing.
Figure 4:
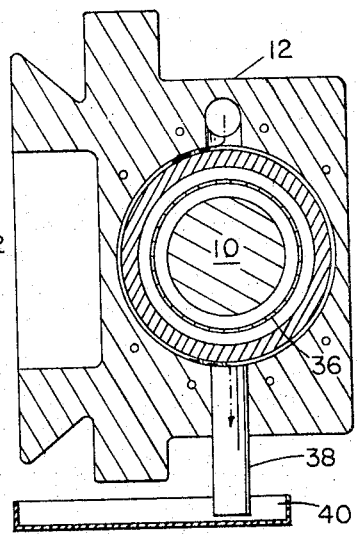
FIG. 4 is a cross section taken on a line 4—4 of FIG. 1 illustrating particularly the labyrinth seal and hydrostatic fluid drain from the spindle assembly.
Figure 1:
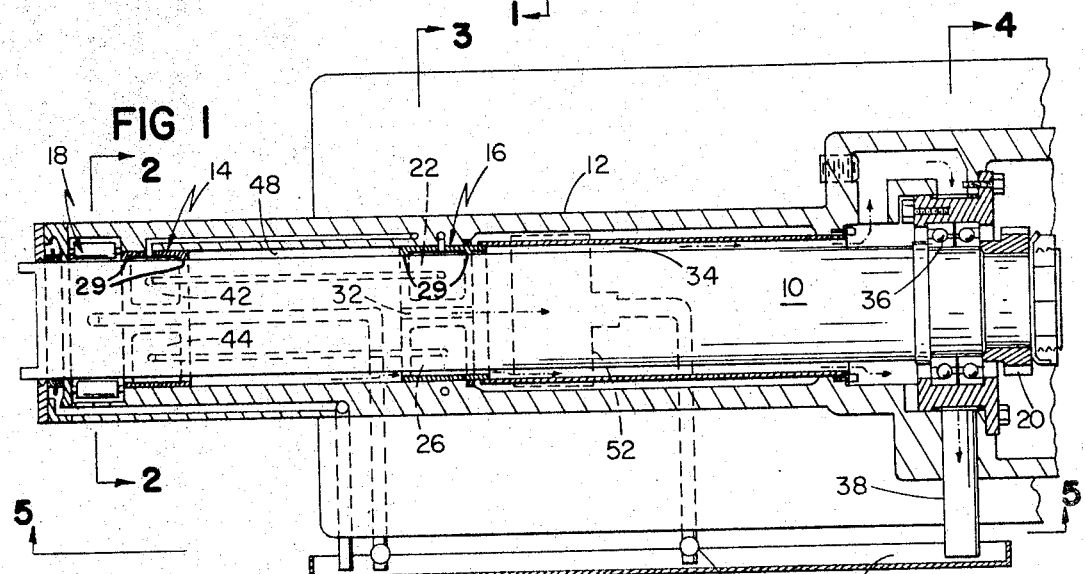
FIG. 1 is a sectional view in side elevation taken on a line 1—1 of FIG. 3 of a machine tool spindle and spindle bearing assembly provided with hydrostatic bearings and an outboard antifriction roller bearing adjacent the tool supporting end of the spindle in accordance with the invention.
Figure 5:
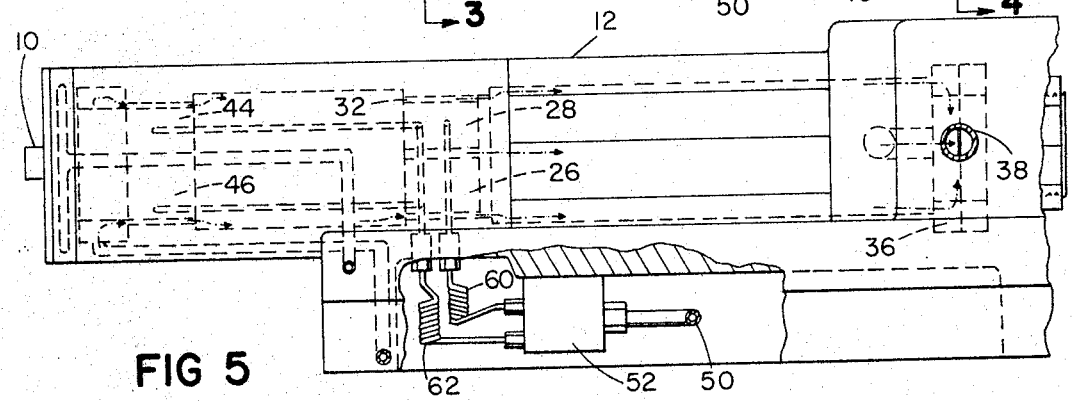
FIG. 5 is a bottom plan view of the spindle and bearing assembly on a line 5—5 of FIG. 1 illustrating particularly the fluid pressure supply lines to the roller and hydrostatic bearings.

The hydrostatic bearing 16 shown in FIGS. 1, 3 and 5 comprises a group of four hydrostatic bearing fluid containing recesses 22, 24, 26 and 28, around the edges of which are raised ⅛ inch lands 29 to provide a radial clearance of approximately .001 inch from the spindle 10. The fluid forced into the recesses under pressure seeps out over the edges of the recesses into separating grooves 32 and into a drainage area 34, and then passes around the rear bearing 36 to a drain 38 and reservoir 40. The hydrostatic bearing 14 is similarly formed with four hydrostatic fluid containing recesses, three of which are indicated respectively at 42, 44 and 46 in FIGS. 1 and 5, from which the fluid is allowed to seep into a drainage area 48, through grooves 32 to the drainage area 34 and drain 38.

The hydrostatic bearing fluid is continuously supplied to the bearings during machine operation from a supply line 50 having a pressure of 1500 p.s.i. to a distributing box 52. The hydrostatic fluid is then distributed through pressure reducing coils 54, 56, 58 and 60 (see FIG. 3) to the four hydrostatic recesses 22, 24, 26 and 28 and through similar reducing coils, one of which is shown in FIG. 5 at 62, to the respective hydrostatic recesses including the above mentioned recesses 42, 44 and 46 of the hydrostatic bearing 14. The pressure of the hydrostatic fluid supplied through the reducing coils 54, 56, 58 and 60 to the hydrostatic recesses of bearing 16 and supplied through reducing coils 62 to the hydrostatic recesses of bearing 14 is about 750 p.s.i. and drops to slightly above atmospheric pressure by the time it reaches the drainage areas 48 and 34.

The hydrostatic bearings described are well adapted to provide a machining center of high precision for operations which impose or medium loads on the bearing as, for example, drilling, boring, light milling and the like operations. A characteristic of the hydrostatic bearing is the ability of the bearing to support a spindle so that it rotates with extreme precision. A further characteristic is the ability of this type of bearing to strongly resist forces trying to move the axis of the spindle away from its hydrostatic center. A spring rate of 6,000,000 lbs. per inch is attainable allowing the spindle to move .0001 inch only away from the hydrostatic center for each 600 lbs. of bearing load. Only when heavy loads are encountered, as for example, in making roughing cuts, does any appreciable displacement occur with the attendant risk of metal to metal contact between the spindle and the hydrostatic boxes.

For a discussion of the characteristics of hydrostatic bearings, reference may be had to a paper, entitled "Error Correcting Action of Hydrostatic Bearings," presented by George N. Levesque at the Lubrication Symposium, New York, N.Y. June 6–9, 1965, of the American Society of Mechanical Engineers (received Mar. 26, 1965). The displacement of the spindle due to loading is calculated in accordance with the formula $$X = \frac{F}{K} = \frac{600 \text{ lbs.}}{6,000,000 \text{ lbs. per inch}} = .0001 \text{ inch}$$

where 600 lbs. is the assumed applied lateral load, and K is the stiffness (spring constant) of the bearing in lbs. per inch.

In accordance with the invention, it is proposed to employ one or more conventional antifriction roller bearings as auxiliary bearings supports for the spindle, said conventional bearing or bearings having a predetermined clearance which is adequate to render said bearings ineffective while the spindle is operating under small or medium loads, but which becomes operative to share heavy loads when the displacement of the hydrostatically supported spindle tends to exceed a predetermined amount. As shown, a backing-up antifriction roller bearing 18 is mounted in the spindle housing 12 to support that portion of the spindle immediately adjacent to and outboard from the spindle hydrostatic bearing 14. The roller bearing 18 has a radial clearance of .0004 inch with relation to the spindle 10 which is sufficient so that the roller bearing has no function and no influence upon the spindle 10 when the spindle is operating under a light or medium load. However, when the load is increased sufficiently to cause displacement of the spindle in its hydrostatic bearings beyond the .0004 inch radial clearance of the backing-up antifriction roller bearing 18, the roller bearing becomes operative to share the load, thereby substantially limiting the displacement of the spindle and at the same time substantially eliminating any chance of metal-to-metal contact between the spindle and the lands of the hydrostatic recesses.

With the construction shown, it will be readily appreciated that the deflections produced under heavy loads will be substantially reduced, thereby improving the accuracy of the roughing cuts produced under heavy loads, so that it becomes possible to extend the metal removal rate for heavy roughing cuts.

Since the major the portion of the load on the spindle bearings is concentrated on that portion of the machine tool spindle adjacent the cutting tool, a single roller bearing 18 only is provided which is located outboard from the hydrostatic bearing 14 closely adjacent the tool carrying end of the spindle 10. It will be understood that a second roller bearing may be provided if so desired adjacent to and supplementing the hydrostatic bearing 16.

The invention having been described what is claimed is:

1. A machine tool spindle assembly which comprises, in combination:
   a tool supporting spindle,
   a spindle housing,
   hydrostatic bearings for the spindle spaced in the housing including hydrostatic fluid containing recesses spaced about the spindle and lands around said recesses having a radial clearance from the spindle, and
   an antifriction bearing for the spindle mounted in said housing outboard from said hydrostatic bearings adjacent the tool supporting end of the spindle,
   said antifriction bearing having a substantially smaller clearance from the spindle than the clearance said hydrostatic bearings have from the spindle so that the antifriction bearing is inoperative under light and medium spindle loads, and becomes operative only to share heavy loads which tend to displace the spindle in its hydrostatic bearings sufficiently to engage the spindle with the antifriction bearing.

2. A machine tool spindle assembly according to claim 1, in which the hydrostatic bearings have a radial clearance in the order of .001 inch from the spindle, and the antifriction bearing is a roller bearing having a radial clearance in the order of .0004 inch from the spindle.

3. A machine tool spindle assembly according to claim 2, in which a plurality of said antifriction roller bearings are provided spaced along the length of the spindle to share heavy spindle loads with said hydrostatic bearings.

References Cited

UNITED STATES PATENTS 3,305,280  2/1967  Peterson _____ 308—35

FOREIGN PATENTS 462,497  3/1937  Great Britain.

MARTIN P. SCHWADRON, *Primary Examiner.*

FRANK SUSKO, *Assistant Examiner.*